US006574587B2

(12) United States Patent
Waclawski (10) Patent No.: US 6,574,587 B2
(45) Date of Patent: *Jun. 3, 2003

(54) SYSTEM AND METHOD FOR EXTRACTING AND FORECASTING COMPUTING RESOURCE DATA SUCH AS CPU CONSUMPTION USING AUTOREGRESSIVE METHODOLOGY

(75) Inventor: Anthony C. Waclawski, Colorado Springs, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,966

(22) Filed: Feb. 27, 1998

(65) Prior Publication Data

US 2001/0013008 A1 Aug. 9, 2001

(51) Int. Cl.[7] .............................................. G06F 17/00
(52) U.S. Cl. ....................................... 702/186; 702/179
(58) Field of Search ............................ 705/1; 709/104, 709/103, 224, 226; 714/1, 4; 702/179, 181, 182, 186

(56) References Cited

U.S. PATENT DOCUMENTS

| 5,796,606 A | * | 8/1998 | Spring ..................... 702/179 X |
| 5,884,037 A | * | 3/1999 | Aras et al. ................... 709/226 |
| 5,956,702 A | * | 9/1999 | Matsuoka et al. ............. 706/22 |
| 5,966,509 A | * | 10/1999 | Abe et al. ....................... 714/4 |

FOREIGN PATENT DOCUMENTS

WO          99/44112     *   9/1999

OTHER PUBLICATIONS

Groschwitz, et al., "A Time Series Model of Long-Term NSFNET BackboneTraffic", Proceedings of the IEEE Intnl. Conf. on Communications, pp. 1400–4, May 1994.*
Zhou, "Forecasting Sales and Price for Existing Single--Family Homes: A VAR Model with Error Correction", Journal of Real Estate Research, 1997, pp. 155–167.*
Brockwell and Davis, Introduction to Time Series and Forecasting, Springer–Verlag, 1996, pp. 13–14, 28–29, 31–34.*
Bolot et al. "Performance Engineering of the World Wide Web: Application to Dimensioning and Cache Design" Proceedings of the Fifth International Conf. on the WWW Paris, France pp. 1–12, 1996.*

(List continued on next page.)

Primary Examiner—M. Kemper (57) ABSTRACT

A system and method for extracting and forecasting computing resource data such as workload consumption of mainframe computing resources using an autoregressive model. The system and method forecast mainframe central processing unit (CPU) consumption with ninety-five percent accuracy using historical performance data. The system and method also provide an upper ninety-five percent confidence level and a lower ninety-five percent confidence level. The system and method retrieve performance records from a computer platform in one second intervals, statistically collapses the one second performance data into fifteen minute performance data, statistically collapses the fifteen minute performance data into one week performance data, and generates a time series equivalent to collecting performance data at one week intervals. The system and method ensure that the resulting time series is statistically stationary, and applies an autoregressive construct to the time series to generate forecast of future CPU utilization, as well as to generate reports and graphs comparing actual vs. forecast CPU utilization. Because the system and method rely on electronically generated empirical historical computer performance data as an input, they provide a turnkey solution to CPU consumption forecasting that can be implemented easily by any system network manager.

13 Claims, 5 Drawing Sheets

OTHER PUBLICATIONS

Wolski, "Forecasting Network Performance to Support Dynamic Scheduling Using the Network Weather Service" The Sixth IEEE International Symposium on High Performance Distributed Computing 1997 Proceedings pp. 316–325, Aug. 1997.*

Prokopenko, "Learning Algorithm for Selection of an Autoregressive Model for Multi–step Ahead Forecast" Proceedings of the Third Australian and New Zealand Conference on Intelligent Information Systems pp. 47–52, Nov. 1995.*

Alexopoulos, C. "Advanced Simulation Output Analysis for a Single System" Winter Simulation Conference Proceedings pp. 89–96, Dec. 1993.*

Basu et al. "Time Series models for Internet Traffic" INFOCOM '96, Fifteenth Annual Joint Conference of the IEEE Computer Societies Networking the Next Generation V2 pp. 611–620, Mar. 1996.*

Chanda, "Chi–square Goodness of Fit Tests for Strong Mixing Stationary Processes", abstract, Interim Report, Aug. 1973.*

Choukri et al., "A General Class of Chi–square Statistics for Goodness–of–Fit Tests for Stationary Time Series", Proc. SPIE–The Int'l Soc. Optical Engineering, abstract, Jul. 1994.*

Shimakawa et al., "Acquisition and Service of Temporal Data for Real–Time Plant Monitoring" Proc. Real–Time Sys. Symposium, pp. 112–118, Dec. 1993.*

Vis et al., "A Note on Recursive Maximum Likelihood for Autoregressive Modeling" IEEE Trans. on Signal Processing v.42,n. 10,pp. 2881–2883, Oct. 1994.*

* cited by examiner

SYSTEM AND METHOD FOR EXTRACTING AND FORECASTING COMPUTING RESOURCE DATA SUCH AS CPU CONSUMPTION USING AUTOREGRESSIVE METHODOLOGY

TECHNICAL FIELD

The present invention relates to a computer platform, and in particular, to a system and method to forecast the performance of computing resources.

BACKGROUND OF THE INVENTION

The computing resources of a large business represent a significant financial investment. When the business grows, resource managers must ensure that new resources are added as processing requirements increase. The fact that the growth and evolution of a computing platform is often rapid and irregular complicates management efforts. This is especially true for computing platforms common to banking institutions and telecommunications companies, for example, whose computing platforms typically include hundreds of geographically distributed computers.

To effectively manage the vast resources of a computing platform and to justify any requests for acquisition of new resources, managers need accurate forecasts of computing platform resource performance. However, conventional forecasting tools may not be adequate for use on computing platforms. For example, conventional sales performance forecasting tools, which use linear regression and multivariable regression to analyze data, commonly factor in such causal variables as the effect of holiday demand, advertising campaigns, price changes, etc. Similarly, pollution forecasting tools typically consider the causal effect of variations in traffic patterns. As such, using these tools to forecast computing platform resources may be problematical because causal parameters generally are difficult to establish and are unreliable.

Other conventional forecasting tools may be limited by the amount of data they can process. For example, some forecasting tools may not adequately purge older or non-essential data. Other forecasting tools may not appropriately incorporate new data as it becomes available. Still other forecasting tools may not have the computing power to perform calculations on large amounts of data.

The limitations of established forecasting tools are particularly troublesome when forecasting resources in computing platforms that are expanding or are already re-engineered. These computing platforms need a forecasting system and method that deal appropriately with new data as well as unneeded data. Moreover, these computing platforms need a forecasting system and method that augment causal-based forecasting tools to provide accurate and reliable forecasts.

SUMMARY OF THE INVENTION

Presented herein is a system and method to forecast computing platform resource performance that overcomes the limitations associated with conventional forecasting tools. An embodiment applies an autoregressive model to electronically generated empirical data to produce accurate and reliable computing platform resource performance forecasts. An embodiment of the present invention also statistically collapses large amounts of data, eliminates unneeded data, and recursively processes new data. The forecasts are compared to actual performance data, which may be graphically displayed or printed. A specific type of data is not important for the present invention, and those skilled in the art will understand that a wide variety of data may be used in the present invention. For example, the present invention contemplates any data that may be collected and verified over time. These data include, for example, Internet metering data, marketing data on the success or failure of product offerings, telephone usage patterns, cash flow analyses, financial data, customer survey data on product reliability, customer survey data on product preference, etc.

The system and method operate within a computing platform. In one embodiment, the computing platform may be a multiple virtual storage (MVS) computing platform. In another embodiment, the computing platform may be a UNIX computing platform. In other embodiments, the computing platforms may be disk operating system (DOS) computing platforms. Those skilled in the art will appreciate that a variety of computing platforms may be used to implement the present invention.

The computing platform includes at least one resource whose performance is forecast. In one embodiment, the computing platform resource may be a central processing unit (CPU). In another embodiment, the computing platform resource may be a memory storage unit. In other embodiments, the computing platform resource may be a printer, a disk, or a disk drive unit. A specific computing platform resource is not important for the present invention, and those skilled in the art will understand that a number of resources may be used in the present invention.

Each resource includes at least one aspect. The aspect may be a performance metric. The performance metric may be resource utilization. "Utilization" is defined generally herein as the percentage that a particular computing platform resource is kept busy. Utilization is often termed "consumption."

In another embodiment, the performance metric may be resource efficiency or resource redundancy. "Efficiency" is defined generally herein as the measure of the useful portion of the total work performed by the resource. "Redundancy" is defined generally herein as the measure of the increase in the workload of a particular resource. Of course, those skilled in the art will appreciate that a particular performance metric is not required by the present invention. Instead, a number of performance metrics may be used.

In one embodiment, the computing platform includes a resource manager. The resource manager collects performance data from its associated resource. The performance data is associated with a performance metric. In one embodiment, the resource manager collects performance data representing a CPU utilization performance metric.

The resource manager collects the performance data in regular intervals. In one embodiment, regular intervals include one-second intervals, for example. That is, in this embodiment, the resource manager collects performance data from its associated computer(s) every second. The interval size in which performance data is collected may be determined by the particular use for the performance metric, the particular resource, the particular computing platform, etc.

The computing platform also includes a plurality of statistical collapsers that statistically collapse the performance data into a series. In one embodiment, the series may be a time series representing a performance metric. A "time series" is defined generally herein as any ordered sequence of observations. Each observation represents a given point in time and is thus termed a "time point." Accordingly, a time series includes at least one time point.

A first statistical collapser generates a first time series representing a performance metric as though its associated performance data had been collected at a first interval. The first time series includes a first set of time points. In one embodiment, the first statistical collapser generates a time series representing a performance metric as though its associated performance data had been collected in fifteen minute intervals. Accordingly, the time series includes four time points for each hour. In another embodiment, the first statistical collapser generates a time series representing a performance metric as though its associated performance data had been collected hourly. Accordingly, the time series includes one time point for each hour. It will be understood by persons skilled in the relevant art that the present invention encompasses statistical collapsers that generate time series representing performance metrics as though their associated performance data had been collected at any of a variety of suitable intervals. The interval size and corresponding number of time points generated by the first statistical collapser may be determined by the particular use for the performance metric, the particular resource, the particular computing platform, etc.

The computing platform also includes a database that stores data. In one embodiment, the database stores the time series representing the performance metric as though its associated performance data had been collected at fifteen-minute intervals.

The computing platform also includes a data extractor to extract data from the database. According to one embodiment, the data extractor extracts from the database the time series representing the performance metric as though its associated performance data had been collected at fifteen minute intervals.

The computing platform also includes a second statistical collapser. The second statistical collapser statistically collapses the first time series, producing a second time series. The second time series includes a second set of time points. In one embodiment, the second statistical collapser statistically collapses the fifteen minute time series into a one-week time series. That is, the second statistical collapser generates a time series representing a performance metric as though its associated performance data had been collected weekly. Accordingly, the time series includes approximately four time points for each month. In another embodiment, the second statistical collapser generates a time series representing a performance metric as though its associated performance data had been collected daily. The corresponding time series includes approximately thirty time points for each month. It will be understood by persons skilled in the relevant art that the second statistical collapser may generate time series representing a performance metric as though its performance data had been collected at any of a variety of suitable intervals. As described above with reference to the first statistical collapser, the interval size and corresponding number of time points generated by the second statistical collapser may be determined by the particular use for the performance metric, the particular resource, the particular computing platform, etc.

The computing platform also includes a time series analyzer to determine whether the second time series is statistically stationary. The time series analyzer uses a plurality of $X^2$ (chi-square) tests to make this determination. The time series analyzer also evaluates autocorrelation statistics and autocovariance statistics. If the time series analyzer determines that the time series is statistically nonstationary, which is likely the case, then the time series analyzer converts the statistically nonstationary time series to a statistically stationary time series by differencing each time point in the time series. The statistically stationary time series now represents the differenced values of performance data.

The computing platform also includes a time point converter. If the time series is already statistically stationary or after the time series analyzer converts the time series to statistical stationarity, the time point converter applies a statistical data set to the time series. Recall that the time series represents the performance metric as though its associated performance data had been collected from the computing platform at regular intervals. As such, the time series includes information indicating the time that the performance data was collected. In one embodiment, this information includes a date/time stamp. That is, each data point in the time series includes a date/time stamp. The statistical data set converts each date/time stamp in the time series into a value representing a decimal number equivalent to the date/time stamp.

One feature of the present invention is an autoregressive modeling tool, which is applied to the converted time series to forecast a particular aspect of the computing platform. The autoregressive modeling tool is chosen by calculating autocorrelation, inverse autocorrelation, and partial autocorrelation functions, and by comparing these functions to theoretical correlation functions of several autoregressive constructs. In particular, one embodiment applies a first order mixed autoregressive construct, such as an autoregressive moving average (ARMA) construct, to the differenced time series. Another embodiment applies an autoregressive integrated moving average (ARIMA) construct to the differenced time series. In the embodiment where the performance metric is resource utilization and the resource is a CPU, the resulting autoregressive modeling tool reliably forecasts CPU consumption with a ninety-five percent accuracy, provides an upper ninety-five percent confidence level, and provides a lower ninety-five percent confidence level. Conventional systems and methods that rely on linear regression or multivariable regression techniques may carry a lower confidence level.

Another feature of the present invention is that it uses empirical data as inputs to the autoregressive modeling tool. Using empirical data rather than causal variables provides more accurate forecasts. In the embodiment where the performance metric is resource utilization and the resource is a central processing unit, the empirical data is actual historical performance data, including logical CPU utilization information as well as physical CPU utilization information. Moreover, the system and method generate recursive forecasts whereby actual future performance data is fed back into the autoregressive modeling tool to calibrate the autoregressive modeling tool.

The computing platform includes a results processor, which generates graphical representations of a performance metric. The results processor also generates information for use in written reports that document the results of the forecasting process. The graphical and textual representations demonstrate the greater accuracy and reliability the present invention provides over conventional forecasting systems and methods.

In one embodiment, the results processor may be a graphical display unit, such as a computer display screen. In another embodiment, the results processor may be a textual display unit, such as a printer. In the embodiment where the performance metric is resource utilization and the resource is a central processing unit, the results processor produces reports and graphical representations of comparisons of actual CPU utilization with CPU utilization forecasts.

Further features and advantages of the present invention as well as the structure and operation of various embodiments are described in detail below.

BRIEF DESCRIPTION OF THE FIGURES

The present invention is best understood by reference to the figures, wherein references with like reference numbers indicate identical or functionally similar elements. In addition, the left-most digits refer to the figure in which the reference first appears in the accompanying figures in which.

DETAILED DESCRIPTION OF THE INVENTION

A computer platform, and in particular, a system and method for forecasting computer platform resource performance is described herein. In the following description, numerous specific details, such as specific statistical symbols and relationships, specific methods of analyzing and processing computer performance data, etc., are set forth in order to provide a full understanding of the present invention. One skilled in the relevant art, however, will readily recognize that the present invention can be practiced without one or more of the specific details, or with other methods, etc. In other instances, well-known structures or operations are not shown in detail in order to avoid obscuring the present invention.

For illustrative purposes, embodiments of the present invention are sometimes described with respect to a system and method for forecasting computer platform resource performance. It should be understood that the present invention is not limited to these embodiments. Instead, the present invention contemplates any data that may be collected and verified over time. These data may include, for example, Internet metering data, marketing data on the success or failure of product offerings, telephone usage patterns, cash flow analyses, financial data, customer survey data on product reliability, customer survey data on product preference, etc.

I. EXAMPLE ENVIRONMENT

Figure 1:
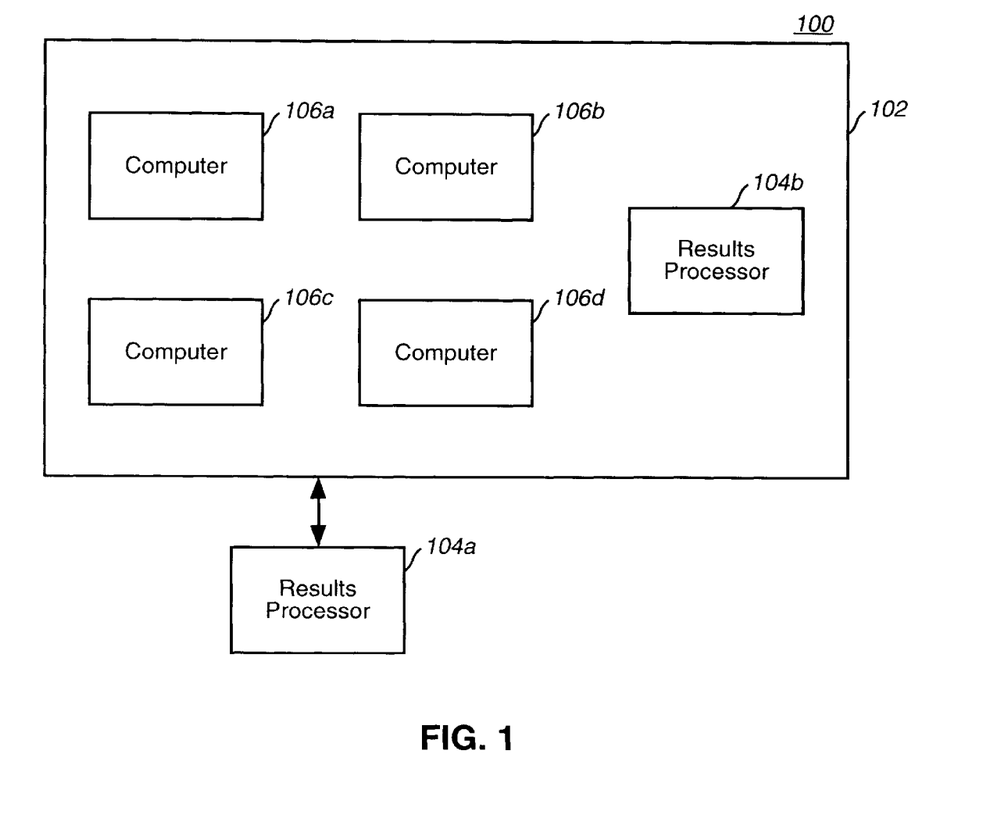
FIG. 1 is a high-level block diagram of a computer platform suitable for use in an embodiment of the present invention.

FIG. 1 is a high-level block diagram of a computing platform 100 suitable for implementing an embodiment of the present invention. In this embodiment, the computer platform 100 is a multiple virtual storage (MVS) platform available from International Business Machines (IBM), or equivalent platform available from Amdahl and Hitachi Data Systems. In another embodiment, the computing platform 100 may be a UNIX computing platform. In other embodiments, the computing platform 100 may be a disk operating system (DOS) or a personal computer disk operating system (PC-DOS) computing platform. Those skilled in the art will appreciate that a variety computing platforms may be used to implement the present invention.

The computing platform 100 includes a computing network 102. Typically, the computing network 102 may be a manufacturing facility, a telecommunications network, a multinational corporation, a financial institution, or a university, for example, that operates in a client-server environment. In that instance, the computing network 102 may connect "client" systems with "server" systems so that the server systems may perform a computation, retrieve a file, or search a database for a particular entry in response to a request by the client system. It is not uncommon for the client system to subsequently translate the response from the server system into a format that a human can understand.

To illustrate, suppose that the computing network 102 supports a bank. The bank has customer financial records, including personal bank account information stored in a large database. The personal bank account database acts as a server. The bank also provides access to its personal account database by certain client systems. For example, one client system may include a large number of point-of-sale cash registers or gas pump bank card readers. As a customer with a bank account at the bank attempts to purchase merchandise or gas using her bank card, the point-of-sale cash register or gas pump bank card reader accesses the customer's bank account information stored in the database. The point-of-sale cash register or gas pump bank card reader acting as a client system requests a determination from the bank personal account database of whether the customer has funds to cover the purchase price. The database responds accordingly, and the purchase is either authorized or refused. A particular type of client-server environment is not essential to the present invention. It will be apparent to those skilled in the art that the exemplary embodiment may be implemented in other client-server environments, such as an airline flight reservation system, a mail-order facility, etc.

In one embodiment, the computing network 102 includes a plurality of computers 106, as represented by computers 106a–106d. For ease of explanation, however, the various embodiments generally are described with respect to only one computer 106. Moreover, although an embodiment is sometimes described in the context of a large complex of distributed computers, the present invention is not limited to this embodiment. For example, the computers 106 may be arranged in a local area network (LAN) configuration in a building or in a group of buildings within a few miles of each other. Alternatively, the computers 106 may be located in a wide area network (WAN) configuration, wherein the computers 106 are linked together but geographically separated by great distances. The computers 106 may also be stand-alone devices not necessarily in communication with each other. The computer 106 in one embodiment is a mainframe computer available from IBM or equivalent mainframe computer available from Amdahl and Hitachi Data Systems. Alternatively, the computer 106 may be a high-performance workstation. Alternatively still, the computer 106 may be a personal computer.

The computing platform 100 includes at least one resource. In one embodiment, the computing platform resource may be a central processing unit (CPU). In another embodiment, the computing platform resource may be a memory storage unit. In other embodiments, the computing platform resource may be a printer, a disk, or a disk drive unit. While a specific computing platform resource is not important for the present invention, those skilled in the art will understand that any number of resources can be used in the present invention.

Each resource includes at least one aspect. The aspect may be a performance metric. In one embodiment the performance metric may be resource utilization. Utilization is the measure of the percentage that a particular computing platform resource is kept busy, and is sometimes termed consumption. In another embodiment, the performance metric may be resource efficiency, which is defined as the measure of the useful portion of the total work performed by the resource. In another embodiment, the performance metric may be resource redundancy, which is defined as the measure of the increase in the workload of a particular resource. Of course, those skilled in the art will appreciate that a particular performance metric is not required by the present invention. Instead, the present invention supports any of a number of performance metrics.

Figure 2:
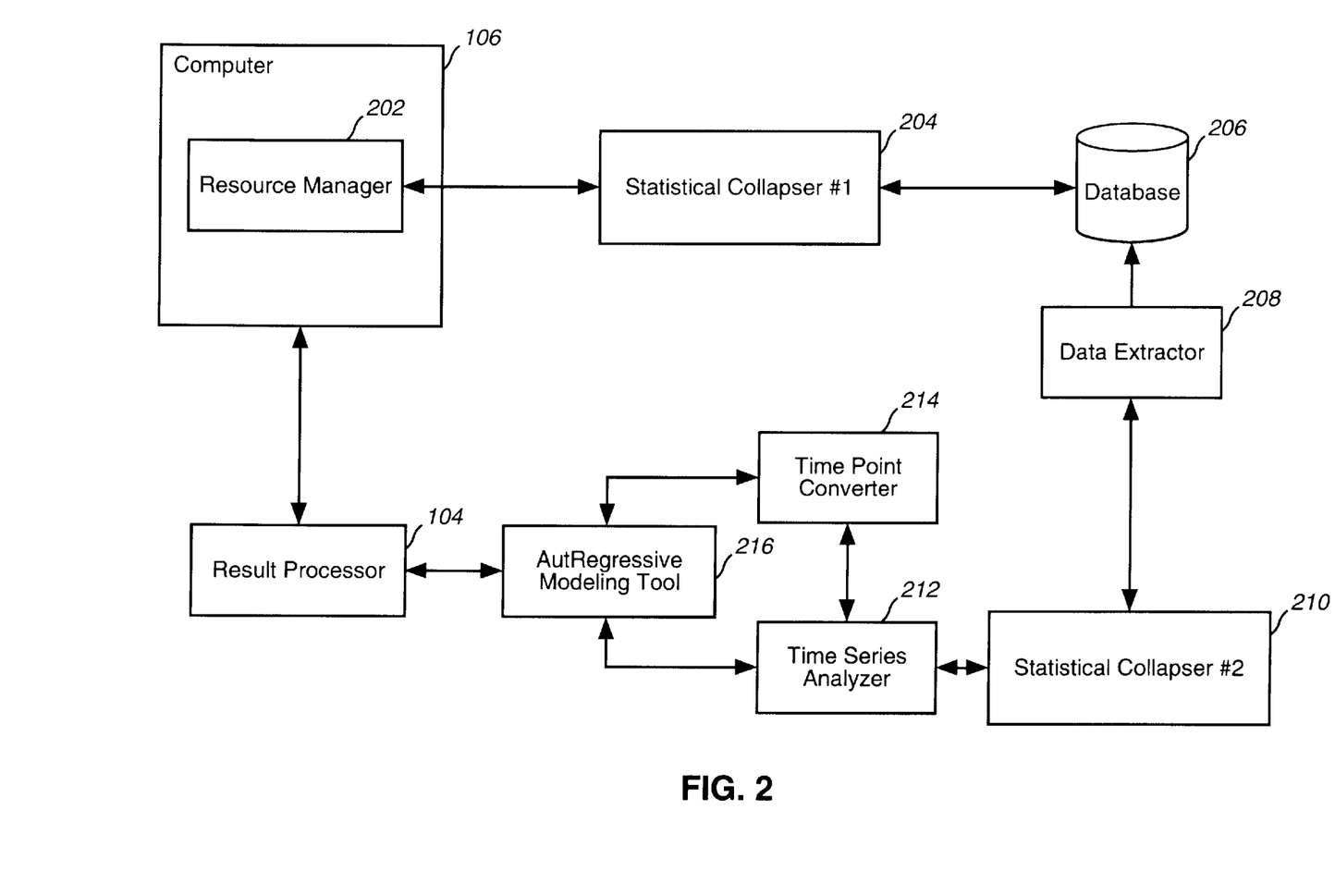
FIG. 2 is a more detailed depiction of the block diagram of the computer platform of FIG. 1.

FIG. 2 is a more detailed block diagram of the computing platform 100 according to one embodiment. As illustrated, each computer 106 includes a resource manager 202. Each resource manager 202 collects performance data from its associated resource. The performance data is associated with a performance metric. According to one embodiment, the resource manager 202 is a resource management facility (RMF) available with the multiple virtual storage (MVS) operating system that is running on the IBM mainframe computer as noted above or an equivalent mainframe computer available from Amdahl and Hitachi Data Systems. According to this embodiment, the resource manager 202 extracts historical performance data from a processor resource/systems manager (PR/SM) (not shown) of the computer 106. This historical computer performance data represents the CPU utilization and is equivalent to performance metering data obtained by real-time monitors. Thus, the CPU utilization information collected by the resource manager 202 are CPU utilization records that contain CPU activity measurements.

The resource manager 202 collects the performance data from the computer 106 at regular intervals. According to an exemplary embodiment, the regular intervals are one-second intervals. That is, according to the exemplary embodiment, the resource manager collects CPU workload performance data every second from computer 106. In this way, the resource manager 202 provides the percent busy for each computer 106 each second in time. The interval size in which performance data is collected may be determined by the particular use of the performance metric, the particular resource, the particular computing platform, etc.

Because the computers 106 typically are maintained by large entities, the amount of data collected usually is quite large. Consequently, the data must be reduced to a manageable level. Statistically collapsing the one-second records generated by the resource manager 202 serves this purpose. The computing platform 100 thus also includes a plurality of statistical collapsers that statistically collapse the performance data into time series representing a performance metric. A "time series" is defined herein generally as any ordered sequence of observations. Each observation represents a given point in time and is thus termed a "time point." A statistical collapser averages a series of time points and generates a time series representing a performance metric as though its associated performance data had been collected at a particular interval. The resulting time series contains a set of time points commensurate with the representative collection interval.

According to one embodiment, the computing platform 100 includes a statistical collapser 204 that statistically collapses the performance data collected by the resource manager 202 into a time series. The statistical collapser 204 generates a time series representing performance data as though it had been collected at fifteen-minute intervals. Accordingly, the time series would include four time points for each hour. In another embodiment, the first statistical collapser generates a time series representing a performance metric as though its associated performance data had been collected hourly. Accordingly, the time series would include one time point for each hour.

Thus, the statistical collapser 204 statistically collapses the CPU utilization records generated every second by the resource manager 202 into CPU utilization records representing fifteen-minute intervals. Nine hundred original CPU utilization records ([60 seconds/minute]×[15 minutes]=900) are averaged to produce one collapsed time point. The statistical collapser 204 calculates the mean for all metering records collected by the resource manager 202, as described in greater detail below. The statistical collapser 204 then determines the median for each mean at fifteen-minute intervals. The time series generated by the statistical collapser 204 thus consists of four data points (or time points) per hour representing the mean CPU utilization percentage. It will be understood by persons skilled in the relevant art that the present invention encompasses statistical collapsers that generate time series representing performance metrics as though its associated performance data had been collected at any of a variety of suitable intervals. The interval size and corresponding number of time points generated by the statistical collapser may be determined by the particular use of the performance metric, the particular resource, the particular computing platform, etc.

A stochastic process, such as the time series representing the performance metric as though its performance data had been collected at fifteen-minute intervals, may be represented by $Z(\omega,t)$. As used herein, a stochastic process is generally a family of time indexed random variables, $Z(\omega,t)$, where $\omega$ belongs to a sample space and t belongs to a time index set. That is, for a fixed time, t, $Z(\omega,t)$ is a random variable. For a given $\omega$, $Z(\omega,t)$, as a function of time, t, is called a sample function or realization. Thus, a time series is a realization or sample function from a certain stochastic process. Typically, however, the variable $\omega$ is suppressed, and the process is written $Z(t)$ or $Z_t$. The process is then called a real-valued process because it assumes only real values. The imaginary value, $\omega$, is not treated. Moreover, for any given real-valued process $\{Z(\omega,t): t=0,\pm1,\pm2, \ldots \}$, the mean function of the process is given by $\mu_t=e(Z_{ft})$, which may be used by the statistical collapser 204 to calculate the mean for all metering records collected by the resource manager 202.

The computing platform also includes a database 206 that stores data. In one embodiment, the database 206 stores the time series representing a performance metric as though its associated performance data had been collected at fifteen-minute intervals. That is, after the resource manager 202 collects the performance data from the computers 106 and after the statistical collapser 204 generates the time series representing performance data collected at fifteen-minute intervals, the database 206 stores the time series.

The database 206, in one embodiment, is capable of storing at least sixty gigabytes of performance data and can process at least one record per second. For example, the database 206 stores thousands of mainframe computer performance statistical descriptors and resource utilization data. Although the database 206 is depicted as a single database, according to the exemplary embodiment, the database 206 may be a plurality of databases. A database suitable for implementing the database 206 is a MICS database available from Computer Associates located in Santa Clara, Calif., or an SAS IT Service Vision database available from SAS Institute located in Cary, N.C.

The computing platform also includes a data extractor 208 to extract data from the database 206. According to an exemplary embodiment, the data extractor 208 extracts from the database 206 the time series representing a performance metric as though its associated performance data had been collected at fifteen minute intervals.

Because the statistically collapsed data stored in the database 206 representing nine hundred original CPU utilization records still may be unwieldy, it may be reduced to a more manageable level. The computing platform 100 thus includes a second statistical collapser 210. In general, the second statistical collapser 210 statistically collapses the first time series, producing a second time series. The second time series includes a second set of time points. In one embodiment, the second statistical collapser 210 statistically collapses the fifteen minute time series into a one-week time series. That is, the second statistical collapser 210 averages the fifteen minute time series and generates a time series representing a performance metric as though its associated performance data had been collected weekly. Accordingly, the time series includes approximately four time points for each month.

In another embodiment, the second statistical collapser 210 averages the fifteen minute time series and generates a time series representing the performance metric as though its associated performance data had been collected daily. Accordingly, the time series includes approximately thirty time points for each month. It will be understood by persons skilled in the relevant art that the second statistical collapser 210 may generate time series representing performance data as though it had been collected at any of the variety of suitable intervals.

It must be noted that if a time series contains too few time points, the time series may not be representative of the particular data under analysis, including, but not limited to Internet metering data, marketing data on the success or failure of product offerings, telephone usage patterns, cash flow analyses, financial data, customer survey data on product reliability, customer survey data on product preference, etc. For example, if the time series in the above example embodiment contains too few time points, the time series may not be representative of actual resource performance. That is, peak usages (or spikes) may not be detected if too few time points are taken. Therefore, sampling intervals which exclude such peaks may inaccurately represent the resource utilization. Thus, the number of time points in the time series may be determined by the particular use of the performance metric, the particular resource, the particular computing platform, etc. To illustrate, suppose a network manager that is responsible for monitoring the behavior and effectiveness of the computing platform 100 resources monitors the performance and activities for each computer 106. The system network manager tracks the computing platform 100 resources performances by gathering the appropriate performance data from each component or network element in the computing platform 100. As described, performance metrics to be monitored include, but are not limited to, CPU consumption percentage, disk drive usage percentage, Internet traffic, users logged on to the Internet, network communication packet traffic, and users logged on to a particular server computer, for example.

Suppose further that the computing network 102 typically includes entities such as a configuration management team and a performance management team. The configuration management team would plan the computing platform 100's growth and modernization. Accordingly, weekly data points would be adequate for these network planning purposes. Daily data points may be more appropriate for use by the performance management team, however. This is because the performance management team would be concerned with maintaining the computing platform 100's error-free performance. Accordingly, the performance management team would be concerned about peak usages (or spikes) in resource consumption of the computing platform 100. Monitoring spikes in the computing platform 100 would facilitate load sharing, for example.

Figure 3:
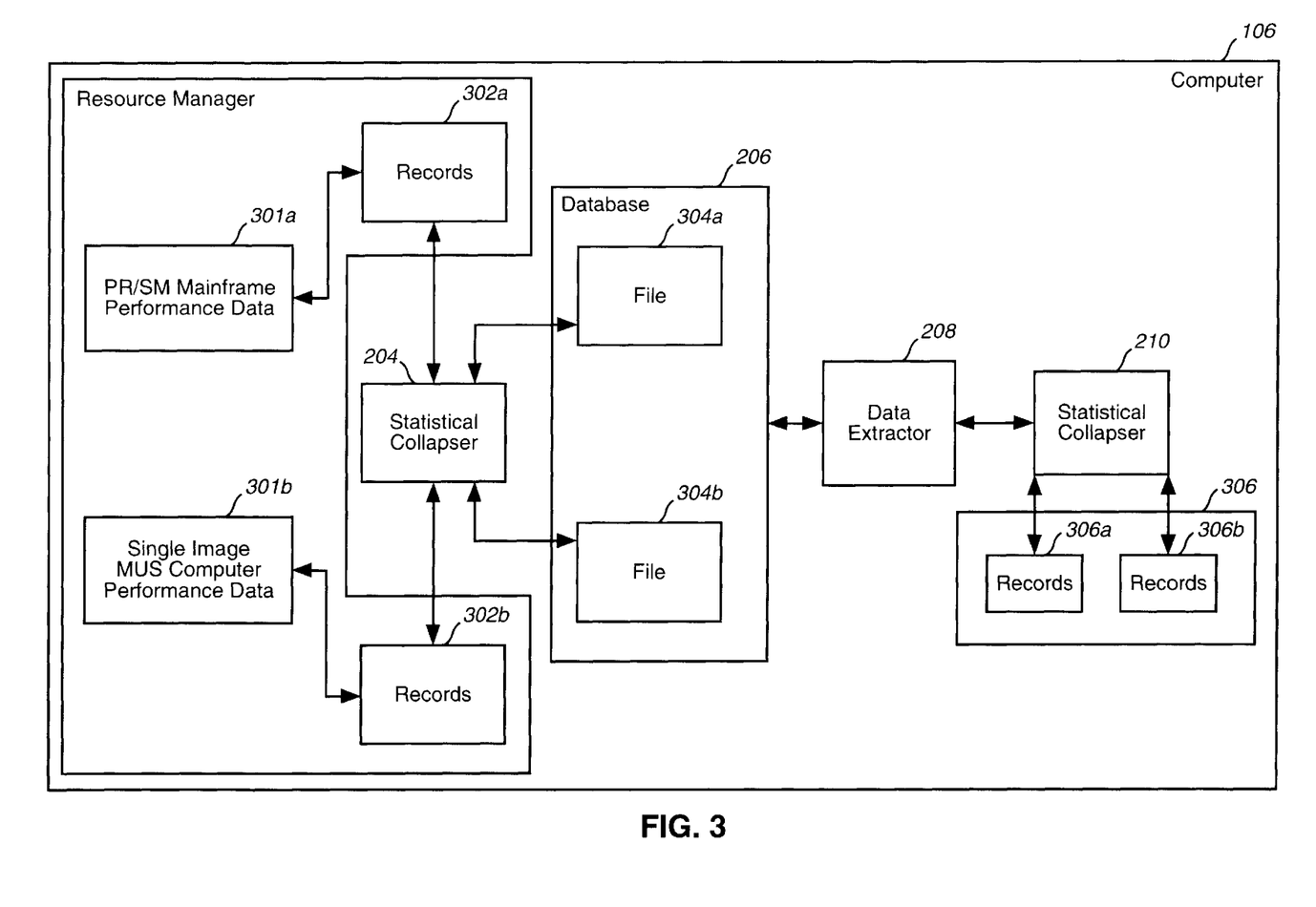
FIG. 3 is a more detailed depiction of the block diagram of the computer platform of FIG. 2.

Referring to FIG. 3, one embodiment of the present invention generates accurate CPU utilization descriptors in the following manner. The resource manager 202 for the computer 106 collects the performance data 301 and provides it in the form of one-second metering records 302 to the statistical collapser 204. The statistical collapser 204 statistically collapses the one-second records 302 into fifteen-minute data, which is stored in a file of performance data 304 of the database 206. The data extractor 208 extracts the performance data 304 from the database 206 and provides it to the statistical collapser 210. The statistical collapser 210 statistically collapses the fifteen-minute data into one-week data.

As described above, the records 302 are metering records for PR/SM computers. Accordingly, the records 302 include both a percentage logical processor busy variable "LPCPC-SSU" from a PR/SM LPAR configuration file from the computer 106, as well as a percentage CPU busy variable "CPU PCBSY" from a the computer 106 hardware utilization CPU activity file, which variables are well-known. According to one embodiment, a set of one-week records 306 represents ([4 records/hour]×[10 hours/day]×[5 days/week]=200) two hundred records. The four records per hour variable represents four time points. The ten hours per day variable represents a prime ten hour operating shift for the computing platform 100. The five days per week variable represents a prime operating work week for the computing platform 100. In other words, the one-week interval records 306 are each a collapse of two hundred fifteen-minute interval records stored in the file 304 of the database 206.

Recall that a time series analogous to the one-week interval data resulted from collapsing the fifteen-minute interval data. According to the constraints of one embodiment, this time period must be statistically stationary. A statistically stationary time series is generally regarded as a time series which as a stochastic process, as defined above, is unchanged by a uniform increment in the time parameter defining the time series.

It must be noted that few time series are statistically stationary. The computing platform 100 thus includes a time series analyzer 212 to determine whether the time series generated by the statistical collapser 210 is statistically stationary. According to one embodiment, the time series analyzer 212 analyzes probability values for a plurality of $X^2$ (chi-square) tests to make this determination. "Chi-square tests" as used herein generally define generalizations and extensions of a test for significant differences between a binomial population and a polynomial population, wherein each observation may fall into one of several classes and which furnishes a comparison among several samples rather than just between two samples. Such chi-square tests include a test of residuals, tests of hypotheses, tests of significance, tests of homogeneity, tests of association, goodness of fit tests, etc., as is known in the relevant art. In the embodiment where the resource is computer 106 and the performance metric is CPU utilization, the time series analyzer 212 determines whether there is a statistically significant correlation between a particular CPU utilization value and the value for CPU utilization for the previous time period by reviewing correlation and covariance statistics. Tables 1–4 list chi-square values for a test for residuals for the computers 106a–106d, respectively. The column "DF" refers to the degrees of freedom of variation among a set of scores. In particular, column "DF" refers to the degrees of freedom of variation among a set of metering records for CPU utilization. To illustrate, suppose there is a set of ten scores. Statistically the degrees of freedom given by $$DF = n - 1,$$

where n is the number of scores. Thus, with a set of ten scores, there would be nine degrees of freedom. In effect, nine sets of scores are free to vary statistically while one set is fixed in value.

TABLE 1

Chi Square Values for the Autocorrelation Test of Residuals for the Computer 106a

| $T_0$ Lag | Chi-Square | DF | Prob. | Autocorrelations | | | | | |
|---|---|---|---|---|---|---|---|---|---|
| 6 | 12.50 | 4 | 0.014 | −0.071 | 0.172 | −0.233 | 0.055 | −0.027 | 0.340 |
| 12 | 16.53 | 10 | 0.085 | 0.112 | −0.012 | −0.008 | −0.016 | 0.159 | 0.143 |
| 18 | 24.26 | 16 | 0.084 | 0.178 | −0.166 | −0.089 | −0.169 | 0.034 | −0.071 |
| 24 | 35.15 | 22 | 0.037 | 0.309 | −0.041 | −0.077 | −0.104 | −0.101 | −0.011 |

TABLE 2

Chi Square Values for the Autocorrelation Test of Residuals for the Computer 106b

| $T_0$ Lag | Chi-Square | DF | Prob. | Autocorrelations | | | | | |
|---|---|---|---|---|---|---|---|---|---|
| 6 | 3.57 | 4 | 0.467 | 0.008 | 0.030 | −0.019 | −0.009 | −0.173 | −0.164 |
| 12 | 11.93 | 10 | 0.290 | −0.206 | 0.046 | −0.007 | −0.148 | 0.043 | 0.235 |
| 18 | 15.70 | 16 | 0.474 | 0.065 | −0.058 | 0.108 | −0.080 | −0.000 | −0.148 |
| 24 | 21.22 | 22 | 0.507 | 0.050 | 0.044 | −0.039 | −0.074 | 0.213 | 0.024 |

TABLE 3

Chi Square Values for the Autocorrelation Test of Residuals for the Computer 106c

| $T_0$ Lag | Chi-Square | DF | Prob. | Autocorrelations | | | | | |
|---|---|---|---|---|---|---|---|---|---|
| 6 | 2.51 | 4 | 0.642 | −0.086 | −0.007 | −0.080 | 0.132 | −0.091 | −0.054 |
| 12 | 5.15 | 10 | 0.881 | −0.029 | 0.141 | 0.015 | −0.110 | −0.060 | −0.055 |
| 18 | 8.45 | 16 | 0.934 | −0.108 | −0.062 | −0.045 | 0.142 | −0.049 | 0.051 |
| 24 | 14.05 | 22 | 0.900 | 0.083 | 0.049 | −0.096 | 0.172 | 0.079 | 0.075 |

TABLE 4

Chi Square Values for the Autocorrelation Test of Residuals for the Computer 106d

| $T_0$ Lag | Chi-Square | DF | Prob. | Autocorrelations | | | | | |
|---|---|---|---|---|---|---|---|---|---|
| 6 | 3.04 | 4 | 0.551 | −0.014 | 0.166 | 0.092 | −0.088 | −0.011 | −0.089 |
| 12 | 6.39 | 10 | 0.781 | −0.116 | −0.021 | 0.035 | −0.113 | 0.125 | −0.078 |
| 18 | 7.65 | 16 | 0.959 | −0.025 | 0.107 | −0.014 | −0.053 | −0.037 | −0.008 |
| 24 | 10.66 | 22 | 0.979 | −0.037 | −0.043 | −0.029 | 0.003 | 0.141 | −0.085 |

As described above, few time series are statistically stationary. Accordingly, the time series analyzer 212 confirms that the time series representing CPU consumption at one-week intervals are likewise not statistically stationary. That is, the time series analyzer 212 confirms that there is a statistically significant correlation between one value of CPU utilization and the value of CPU utilization for the previous time period.

Such correlation is undesirable according to the constraints of one embodiment because the time series thus-contains statistical artifacts extraneous to the data represented by the time series. The correlation within the time series therefore should be broken. This is accomplished by differencing the time series. According to one embodiment, the time series analyzer 212 converts the time series to a statistically stationary time series by differencing each time point in the time series. The time series analyzer 212 averages the differences among the time points and then subtracts the averages from each time point. Thus, rather than modeling the CPU utilization per se, this embodiment models the differenced values of CPU utilization from one period to the next.

A differencing period must be determined that produces the most accurate forecast. The location of points selected, as well as the number of points selected from the time series when differencing determines how robust the resulting construct is. Tables 5–8 list the weekly data points selected using one embodiment to represent CPU utilization for the computers 106a–106d, respectively, in the "mean CPU busy" column.

TABLE 5

| Week | Mean CPU Busy | Forecast | Lower 95% Confidence Level | Upper 95% Confidence Level |
|---|---|---|---|---|
| 11APR96 | 98.91 | — | — | — |
| 19APR96 | 98.92 | 98.51 | 82.82 | 114.2 |
| 25APR96 | 96.08 | 98.29 | 82.60 | 114.0 |
| 03MAY96 | 96.38 | 96.83 | 81.14 | 112.5 |
| 09MAY96 | 96.45 | 96.73 | 81.04 | 112.4 |
| 17MAY96 | 97.49 | 96.54 | 80.85 | 112.2 |
| 23MAY96 | 92.54 | 96.77 | 81.07 | 112.5 |
| 31MAY96 | 83.06 | 94.39 | 78.70 | 110.1 |
| 06JUN96 | 99.28 | 90.04 | 74.35 | 105.7 |
| 14JUN96 | 92.33 | 96.86 | 81.17 | 112.6 |
| 20JUN96 | 87.31 | 93.62 | 77.93 | 109.3 |
| 28JUN96 | 95.70 | 91.21 | 75.52 | 106.9 |
| 04JUL96 | 83.09 | 94.63 | 78.94 | 110.3 |
| 12JUL96 | 87.21 | 88.93 | 73.24 | 104.6 |
| 18JUL96 | 89.77 | 90.49 | 74.80 | 106.2 |
| 26JUL96 | 87.64 | 91.38 | 75.69 | 107.1 |
| 01AUG96 | 67.66 | 90.23 | 74.54 | 105.9 |
| 09AUG96 | 74.76 | 81.32 | 65.63 | 97.01 |
| 15AUG96 | 72.92 | 84.18 | 68.49 | 99.87 |
| 23AUG96 | 81.54 | 83.16 | 67.47 | 98.85 |
| 29AUG96 | 94.31 | 86.68 | 70.99 | 102.4 |
| 06SEP96 | 91.40 | 92.00 | 76.31 | 107.7 |
| 12SEP96 | 95.12 | 90.51 | 74.82 | 106.2 |
| 20SEP96 | 73.85 | 91.90 | 76.21 | 107.6 |
| 26SEP96 | 86.22 | 82.43 | 66.74 | 98.12 |
| 04OCT96 | 82.94 | 87.58 | 71.89 | 103.3 |
| 10OCT96 | 92.51 | 85.93 | 70.24 | 101.6 |
| 18OCT96 | 83.35 | 89.86 | 74.17 | 105.6 |
| 26OCT96 | 85.14 | 85.66 | 69.96 | 101.3 |
| 09NOV96 | 74.62 | 86.21 | 70.52 | 101.9 |
| 15NOV96 | 94.73 | 81.41 | 65.72 | 97.10 |
| 21NOV96 | 86.17 | 89.92 | 74.23 | 105.6 |
| 05DEC96 | 95.41 | 85.98 | 70.29 | 101.7 |
| 13DEC96 | 93.33 | 89.77 | 74.08 | 105.5 |
| 19DEC96 | 99.11 | 88.64 | 72.95 | 104.3 |
| 27DEC96 | 72.55 | 90.92 | 75.23 | 106.6 |
| 10JAN97 | 75.15 | 79.16 | 63.47 | 94.85 |
| 16JAN97 | 79.68 | 80.06 | 64.37 | 95.75 |
| 24JAN97 | 86.72 | 81.81 | 66.12 | 97.50 |
| 30JAN97 | 98.05 | 84.64 | 68.95 | 100.3 |
| 07FEB97 | 94.21 | 89.33 | 73.64 | 105.0 |
| 13FEB97 | 92.53 | 87.44 | 71.75 | 103.1 |
| 21FEB97 | 77.12 | 86.48 | 70.79 | 102.2 |
| 27FEB97 | 82.73 | 79.56 | 63.87 | 95.25 |
| 07MAR97 | 85.37 | 81.78 | 66.09 | 97.47 |
| 13MAR97 | 88.49 | 82.70 | 67.01 | 98.39 |
| 15MAR97 | 85.79 | 83.83 | 68.13 | 99.52 |
| 23MAR97 | 73.48 | 82.43 | 66.74 | 98.12 |
| 06APR97 | 70.25 | 76.86 | 61.17 | 92.55 |
| 12APR97 | 84.31 | 75.22 | 59.53 | 90.92 |
| 18APR97 | 82.00 | 81.11 | 65.42 | 96.80 |

TABLE 5-continued

| Week | Mean CPU Busy | Forecast | Lower 95% Confidence Level | Upper 95% Confidence Level |
|---|---|---|---|---|
| 26APR97 | 82.88 | 79.88 | 64.19 | 95.57 |
| 10MAY97 | 83.81 | 80.03 | 64.34 | 95.72 |
| 16MAY97 | 78.50 | 80.21 | 64.52 | 95.90 |
| 24MAY97 | — | 77.10 | 59.99 | 94.21 |
| 01JUN97 | — | 76.62 | 59.26 | 93.98 |
| 07JUN97 | — | 76.19 | 58.78 | 93.60 |
| 15JUN97 | — | 75.77 | 57.95 | 92.79 |
| 21JUN97 | — | 75.37 | 57.95 | 92.79 |
| 29JUN97 | — | 74.97 | 57.55 | 92.39 |
| 05JUL97 | — | 74.57 | 57.15 | 91.99 |
| 13JUL97 | — | 74.17 | 56.75 | 91.59 |
| 19JUL97 | — | 73.77 | 56.35 | 91.19 |
| 27JUL97 | — | 73.37 | 55.95 | 90.79 |
| 02AUG97 | — | 72.97 | 55.55 | 90.39 |
| 10AUG97 | — | 72.57 | 55.15 | 89.99 |
| 16AUG97 | — | 72.17 | 54.75 | 89.59 |
| 24AUG97 | — | 71.77 | 54.35 | 89.19 |

TABLE 6

| Week | Mean CPU Busy | Forecast | Lower 95% Confidence Level | Upper 95% Confidence Level |
|---|---|---|---|---|
| 11APR96 | 63.95 | — | — | — |
| 19APR96 | 66.24 | 64.11 | 45.16 | 83.06 |
| 25APR96 | 75.12 | 64.90 | 45.95 | 83.85 |
| 03MAY96 | 71.55 | 68.45 | 49.50 | 87.40 |
| 09MAY96 | 65.93 | 71.00 | 52.05 | 89.95 |
| 17MAY96 | 77.47 | 69.79 | 50.84 | 88.74 |
| 23MAY96 | 67.79 | 71.45 | 52.50 | 90.40 |
| 31MAY96 | 68.43 | 71.84 | 52.89 | 90.79 |
| 06JUN96 | 81.53 | 70.13 | 51.18 | 89.08 |
| 14JUN96 | 82.90 | 73.38 | 54.43 | 92.32 |
| 20JUN96 | 57.80 | 78.17 | 59.22 | 97.12 |
| 28JUN96 | 76.27 | 73.27 | 54.32 | 92.22 |
| 04JUL96 | 60.44 | 71.03 | 52.08 | 89.98 |
| 12JUL96 | 75.79 | 69.17 | 50.22 | 88.12 |
| 18JUL96 | 63.34 | 69.47 | 50.52 | 88.42 |
| 26JUL96 | 50.79 | 69.18 | 50.23 | 88.13 |
| 01AUG96 | 64.23 | 62.60 | 43.65 | 81.54 |
| 09AUG96 | 76.07 | 60.74 | 41.79 | 79.69 |
| 15AUG96 | 72.50 | 66.28 | 47.33 | 85.23 |
| 23AUG96 | 82.89 | 70.44 | 51.49 | 89.39 |
| 29AUG96 | 90.05 | 74.80 | 55.85 | 93.75 |
| 06SEP96 | 91.40 | 81.30 | 62.35 | 100.3 |
| 12SEP96 | 87.72 | 86.40 | 67.45 | 105.4 |
| 20SEP96 | 77.73 | 88.06 | 69.11 | 107.0 |
| 26SEP96 | 86.24 | 85.08 | 66.13 | 104.0 |
| 04OCT96 | 80.41 | 84.04 | 65.09 | 103.0 |
| 10OCT96 | 83.86 | 83.61 | 64.66 | 102.6 |
| 18OCT96 | 74.61 | 83.19 | 64.24 | 102.1 |
| 26OCT96 | 85.73 | 80.95 | 62.00 | 99.90 |
| 09NOV96 | 76.62 | 81.21 | 62.26 | 100.2 |
| 15NOV96 | 86.86 | 81.00 | 62.05 | 99.94 |
| 21NOV96 | 90.89 | 82.00 | 63.05 | 101.0 |
| 05DEC96 | 92.88 | 85.90 | 66.95 | 104.9 |
| 13DEC96 | 85.18 | 89.26 | 70.31 | 108.2 |
| 19DEC96 | 88.12 | 89.00 | 70.05 | 108.0 |
| 27DEC96 | 58.33 | 88.10 | 69.15 | 107.1 |
| 10JAN97 | 90.47 | 79.37 | 60.42 | 98.32 |
| 16JAN97 | 70.97 | 78.36 | 59.41 | 97.31 |
| 24JAN97 | 77.50 | 78.94 | 59.99 | 97.89 |
| 30JAN97 | 78.22 | 76.98 | 58.03 | 95.93 |
| 07FEB97 | 85.71 | 77.65 | 58.70 | 96.60 |
| 13FEB97 | 83.08 | 80.38 | 61.43 | 99.33 |
| 21FEB97 | 71.57 | 82.52 | 63.57 | 101.5 |
| 27FEB97 | 86.93 | 79.55 | 60.60 | 98.50 |
| 07MAR97 | 83.41 | 80.24 | 61.29 | 99.19 |
| 13MAR97 | 96.19 | 82.82 | 63.87 | 101.8 |
| 15MAR97 | 88.15 | 87.15 | 68.20 | 106.1 |
| 23MAR97 | 79.12 | 89.58 | 70.63 | 108.5 |
| 06APR97 | 87.12 | 86.32 | 67.37 | 105.3 |
| 12APR97 | 84.95 | 85.20 | 66.25 | 104.1 |

TABLE 6-continued

| Week | Mean CPU Busy | Forecast | Lower 95% Confidence Level | Upper 95% Confidence Level |
|---|---|---|---|---|
| 18APR97 | 66.50 | 85.73 | 66.78 | 104.7 |
| 26APR97 | 70.25 | 79.98 | 61.03 | 98.93 |
| 10MAY97 | 76.15 | 74.35 | 55.40 | 93.30 |
| 16MAY97 | 72.97 | 74.20 | 55.25 | 93.15 |
| 24MAY97 | — | 74.32 | 54.53 | 94.10 |
| 01JUN97 | — | 74.53 | 54.98 | 96.08 |
| 07JUN97 | — | 74.67 | 51.72 | 97.63 |
| 15JUN97 | — | 74.83 | 50.50 | 99.16 |
| 21JUN97 | — | 74.99 | 49.37 | 100.6 |
| 29JUN97 | — | 75.14 | 48.29 | 102.0 |
| 05JUL97 | — | 75.30 | 47.27 | 103.3 |
| 13JUL97 | — | 75.45 | 46.30 | 104.6 |
| 19JUL97 | — | 75.61 | 45.37 | 105.9 |
| 27JUL97 | — | 75.77 | 44.48 | 107.1 |
| 02AUG97 | — | 75.92 | 43.62 | 108.2 |
| 10AUG97 | — | 76.08 | 42.79 | 109.4 |
| 16AUG97 | — | 76.23 | 41.99 | 110.5 |
| 24AUG97 | — | 76.39 | 41.22 | 111.6 |

TABLE 7

| Week | Mean CPU Busy | Forecast | Lower 95% Confidence Level | Upper 95% Confidence Level |
|---|---|---|---|---|
| 11APR96 | 74.48 | — | — | — |
| 19APR96 | 88.23 | 74.76 | 62.31 | 87.20 |
| 25APR96 | 75.57 | 76.10 | 63.66 | 88.54 |
| 03MAY96 | 84.13 | 75.35 | 62.91 | 87.80 |
| 09MAY96 | 73.61 | 76.29 | 63.84 | 88.73 |
| 17MAY96 | 79.35 | 75.71 | 63.27 | 88.16 |
| 23MAY96 | 76.92 | 76.42 | 63.98 | 88.87 |
| 31MAY96 | 66.06 | 76.48 | 64.04 | 88.93 |
| 06JUN96 | 83.72 | 75.88 | 63.44 | 88.33 |
| 14JUN96 | 82.94 | 77.53 | 65.09 | 89.98 |
| 20JUN96 | 79.62 | 77.73 | 65.28 | 90.17 |
| 28JUN96 | 75.31 | 77.72 | 65.28 | 90.16 |
| 04JUL96 | 70.35 | 77.64 | 65.19 | 90.08 |
| 12JUL96 | 73.26 | 77.50 | 65.06 | 89.94 |
| 18JUL96 | 86.43 | 77.98 | 65.54 | 90.43 |
| 26JUL96 | 77.94 | 79.28 | 66.84 | 91.73 |
| 01AUG96 | 69.34 | 78.87 | 66.42 | 91.31 |
| 09AUG96 | 79.64 | 78.44 | 66.00 | 90.89 |
| 15AUG96 | 79.90 | 79.51 | 67.07 | 91.96 |
| 23AUG96 | 79.81 | 79.79 | 67.34 | 92.23 |
| 29AUG96 | 85.81 | 80.04 | 67.59 | 92.48 |
| 06SEP96 | 79.79 | 80.77 | 68.32 | 93.21 |
| 12SEP96 | 84.82 | 80.55 | 68.10 | 92.99 |
| 20SEP96 | 86.84 | 81.20 | 68.76 | 93.64 |
| 26SEP96 | 89.07 | 81.61 | 69.17 | 94.06 |
| 04OCT96 | 84.71 | 82.05 | 69.60 | 94.49 |
| 10OCT96 | 88.20 | 81.96 | 69.51 | 94.40 |
| 18OCT96 | 80.48 | 82.49 | 70.04 | 94.93 |
| 26OCT96 | 83.67 | 82.13 | 69.69 | 94.58 |
| 09NOV96 | 78.33 | 82.64 | 70.20 | 95.09 |
| 15NOV96 | 90.33 | 82.48 | 70.03 | 94.92 |
| 21NOV96 | 80.22 | 83.68 | 71.24 | 96.12 |
| 05DEC96 | 91.71 | 83.14 | 70.69 | 95.58 |
| 13DEC96 | 87.36 | 84.30 | 71.86 | 96.74 |
| 19DEC96 | 89.50 | 84.21 | 71.77 | 96.66 |
| 27DEC96 | 63.88 | 84.64 | 72.19 | 97.08 |
| 10JAN97 | 82.33 | 82.87 | 70.42 | 95.31 |
| 16JAN97 | 81.46 | 84.58 | 72.14 | 97.03 |
| 24JAN97 | 78.47 | 84.77 | 72.32 | 97.21 |
| 30JAN97 | 83.23 | 84.79 | 72.34 | 97.23 |
| 07FEB97 | 92.31 | 85.42 | 72.98 | 97.86 |
| 13FEB97 | 93.73 | 86.39 | 73.95 | 98.84 |
| 21FEB97 | 81.92 | 86.76 | 74.32 | 99.21 |
| 27FEB97 | 84.39 | 86.08 | 73.64 | 98.53 |
| 07MAR97 | 90.97 | 86.53 | 74.09 | 98.98 |
| 13MAR97 | 89.53 | 87.31 | 74.87 | 99.75 |
| 15MAR97 | 82.45 | 87.45 | 75.01 | 99.90 |
| 23MAR97 | 84.13 | 87.15 | 74.70 | 99.59 |
| 06APR97 | 89.94 | 87.54 | 75.09 | 99.98 |

TABLE 7-continued

| Week | Mean CPU Busy | Forecast | Lower 95% Confidence Level | Upper 95% Confidence Level |
|---|---|---|---|---|
| 12APR97 | 94.17 | 88.25 | 75.81 | 100.7 |
| 18APR97 | 87.39 | 88.84 | 76.40 | 101.3 |
| 26APR97 | 77.43 | 88.56 | 76.12 | 101.0 |
| 10MAY97 | 92.78 | 88.03 | 75.58 | 100.5 |
| 16MAY97 | 83.43 | 89.50 | 77.05 | 101.9 |
| 24MAY97 | — | 89.71 | 77.23 | 102.2 |
| 01JUN97 | — | 90.02 | 77.54 | 102.5 |
| 07JUN97 | — | 90.30 | 77.82 | 102.8 |
| 15JUN97 | — | 90.58 | 78.10 | 103.1 |
| 21JUN97 | — | 90.86 | 78.37 | 103.3 |
| 29JUN97 | — | 91.14 | 78.65 | 103.6 |
| 05JUL97 | — | 91.41 | 78.93 | 103.9 |
| 13JUL97 | — | 91.69 | 79.21 | 104.2 |
| 19JUL97 | — | 91.97 | 79.49 | 104.5 |
| 27JUL97 | — | 92.25 | 79.76 | 104.7 |
| 02AUG97 | — | 92.52 | 80.04 | 105.0 |
| 10AUG97 | — | 92.80 | 80.32 | 105.3 |
| 16AUG97 | — | 93.08 | 80.60 | 105.6 |
| 24AUG97 | — | 93.36 | 80.87 | 105.8 |

TABLE 8

| Week | Mean CPU Busy | Forecast | Lower 95% Confidence Level | Upper 95% Confidence Level |
|---|---|---|---|---|
| 11APR96 | 93.60 | — | — | — |
| 19APR96 | 97.86 | 93.68 | 86.00 | 101.4 |
| 25APR96 | 94.98 | 93.77 | 86.09 | 101.4 |
| 03MAY96 | 94.77 | 93.83 | 86.16 | 101.5 |
| 09MAY96 | 95.67 | 93.91 | 86.24 | 101.6 |
| 17MAY96 | 99.23 | 93.99 | 86.31 | 101.7 |
| 23MAY96 | 94.32 | 94.07 | 86.40 | 101.7 |
| 31MAY96 | 85.44 | 94.14 | 86.46 | 101.8 |
| 06JUN96 | 95.34 | 94.19 | 86.52 | 101.9 |
| 14JUN96 | 96.71 | 94.29 | 86.62 | 102.0 |
| 20JUN96 | 92.43 | 94.37 | 86.70 | 102.0 |
| 28JUN96 | 98.80 | 94.44 | 86.76 | 102.1 |
| 04JUL96 | 88.92 | 94.53 | 86.86 | 102.2 |
| 12JUL96 | 96.01 | 94.58 | 86.91 | 102.3 |
| 18JUL96 | 96.69 | 94.68 | 87.00 | 102.4 |
| 26JUL96 | 94.49 | 94.75 | 87.08 | 102.4 |
| 01AUG96 | 96.60 | 94.82 | 87.15 | 102.5 |
| 09AUG96 | 98.36 | 94.91 | 87.23 | 102.6 |
| 15AUG96 | 93.94 | 94.99 | 87.31 | 102.7 |
| 23AUG96 | 98.03 | 95.05 | 87.38 | 102.7 |
| 29AUG96 | 98.24 | 95.14 | 87.47 | 102.8 |
| 06SEP96 | 92.10 | 95.22 | 87.54 | 102.9 |
| 12SEP96 | 94.35 | 95.28 | 87.60 | 102.9 |
| 20SEP96 | 98.32 | 95.36 | 87.68 | 103.0 |
| 26SEP96 | 98.61 | 95.45 | 87.77 | 103.1 |
| 04OCT96 | 98.67 | 95.52 | 87.85 | 103.2 |
| 10OCT96 | 99.89 | 95.60 | 87.92 | 103.3 |
| 18OCT96 | 98.23 | 95.68 | 88.00 | 103.4 |
| 26OCT96 | 98.88 | 95.75 | 88.08 | 103.4 |
| 09NOV96 | 98.58 | 95.83 | 88.15 | 103.5 |
| 15NOV96 | 99.04 | 95.90 | 88.23 | 103.6 |
| 21NOV96 | 98.47 | 95.98 | 88.31 | 103.7 |
| 05DEC96 | 96.49 | 96.06 | 88.38 | 103.7 |
| 13DEC96 | 93.85 | 96.13 | 88.45 | 103.8 |
| 19DEC96 | 98.21 | 96.20 | 88.52 | 103.9 |
| 27DEC96 | 78.54 | 96.28 | 88.61 | 104.0 |
| 10JAN97 | 95.92 | 96.31 | 88.63 | 104.0 |
| 16JAN97 | 91.43 | 96.43 | 88.76 | 104.1 |
| 24JAN97 | 97.56 | 96.49 | 88.82 | 104.2 |
| 30JAN97 | 97.89 | 96.59 | 88.91 | 104.3 |
| 07FEB97 | 95.20 | 96.66 | 88.99 | 104.3 |
| 13FEB97 | 100.0 | 96.73 | 89.06 | 104.4 |
| 21FEB97 | 99.01 | 96.82 | 89.15 | 104.5 |
| 27FEB97 | 95.94 | 96.90 | 89.22 | 104.6 |
| 07MAR97 | 95.01 | 96.96 | 89.29 | 104.6 |
| 13MAR97 | 99.24 | 97.04 | 89.36 | 104.7 |
| 15MAR97 | 90.65 | 97.13 | 89.45 | 104.8 |
| 23MAR97 | 97.45 | 97.18 | 89.51 | 104.9 |

TABLE 8-continued

| Week | Mean CPU Busy | Forecast | Lower 95% Confidence Level | Upper 95% Confidence Level |
|---|---|---|---|---|
| 06APR97 | 98.57 | 97.27 | 89.60 | 104.9 |
| 12APR97 | 98.83 | 97.35 | 89.68 | 105.0 |
| 18APR97 | 99.37 | 97.43 | 89.76 | 105.1 |
| 26APR97 | 97.03 | 97.51 | 89.83 | 105.2 |
| 10MAY97 | 97.79 | 97.58 | 89.90 | 105.3 |
| 16MAY97 | 94.33 | 97.66 | 89.98 | 105.3 |
| 24MAY97 | — | 97.81 | 90.13 | 105.5 |
| 01JUN97 | — | 97.89 | 90.21 | 105.6 |
| 07JUN97 | — | 97.96 | 90.29 | 105.6 |
| 15JUN97 | — | 98.04 | 90.36 | 105.7 |
| 21JUN97 | — | 98.11 | 90.44 | 105.8 |
| 29JUN97 | — | 98.19 | 90.52 | 105.9 |
| 05JUL97 | — | 98.27 | 90.59 | 105.9 |
| 13JUL97 | — | 98.34 | 90.67 | 106.0 |
| 19JUL97 | — | 98.42 | 90.75 | 106.1 |
| 27JUL97 | — | 98.50 | 90.82 | 106.2 |
| 02AUG97 | — | 98.57 | 90.90 | 106.2 |
| 10AUG97 | — | 98.65 | 90.98 | 106.3 |
| 16AUG97 | — | 98.73 | 91.05 | 106.4 |
| 24AUG97 | — | 98.80 | 91.13 | 106.5 |

As described above, the statistically stationary time series generated by the time series analyzer 212 represents performance data that is collected from the computer platform 100 at regular intervals. As such, the time series includes information indicating the time that the performance data was collected from the computers 106. In one embodiment, each data point in the time series includes a date/time stamp. Note that Tables 5–8 include a date/time stamp in the "week" column. The date/time stamp provided takes a form that in one embodiment is not as compatible with the system and method as desired and therefore must be converted to a more usable form. According to one embodiment, the computing platform 100 includes a time point converter 214, which utilizes a data set and converts the time series date/time stamp to a number of seconds equivalent to the value represented by the date/time stamp under the data set. A data set suitable for implementing the time point converter 214 is available from SAS in Cary, N.C., which converts a date/time stamp to a decimal number.

One feature of the system and method is an autoregressive modeling tool 216. In one embodiment, the autoregressive modeling tool 216 is applied to the statistically stationary time series representing a performance metric as though its performance data had been collected in weekly intervals to forecast the performance of the computing platform 100. The autoregressive modeling tool 216 is selected by calculating autocorrelation, inverse autocorrelation, and partial autocorrelation functions, and comparing these functions to theoretical correlation functions expected from various autoregressive constructs.

For example, in a process, if only a finite number of $\pi$ rates are non-zero, i.e., $\pi_1=\phi_1, \pi_2=\phi_2, \ldots \pi_p=\phi_p$ and $\pi_k=0$, for k>p, then the process is generally considered an autoregressive model of order p, which is denoted as AR(p). An autoregressive model of order p is given by $\dot{Z}_t=\phi_1\dot{Z}_{t-1}\ldots+\phi_p\dot{Z}_{t-p}+\alpha_t$ or $\phi_p(B)\dot{Z}_t=\alpha_2$, where $\phi_p(B)=(1-\phi_1B-\ldots 1-\phi_pB^p)$. Thus, the autoregressive modeling tool 216 takes the time series, $Z_t$, and regresses the value of Z at time t on its own past values plus a random shock value, i.e., $\dot{Z}_t=\pi_1\dot{Z}_{t-1}+\pi_2\dot{Z}_{t-2}+\ldots \alpha_t$ or equivalently, $\pi(B)\dot{Z}_t=\alpha_t$ where $$\pi(B) = 1 - \sum_{j=1}^{\infty} \pi_j B^j, \text{ and } 1 + \sum_{j=1}^{\infty} |\pi j| < \infty.$$

The autocorrelation function becomes $Pk=\phi_1 P_{k-1}=\phi_1^k$, where k>1, and where $\rho_0=1$. The inverse autocorrelation function becomes $$\rho_k(l) = \gamma\frac{\gamma_k(l)}{\gamma_0(l)} = \frac{1}{\gamma_0(l)}\int -\pi^\pi f^{-1}(\omega)e^{ik\omega}d\omega$$

and the partial autocorrelation function becomes $$\phi_{kk} = \begin{cases} \rho_1 = \phi_1, & k = 1 \\ 0, & \text{for } k >= 2. \end{cases}$$

The resulting autoregressive modeling tool 216 may be a first order mixed autoregressive construct. In particular, the autoregressive modeling tool 216 that the system and method apply to the time series may be an autoregressive integrated moving average (ARIMA) model to forecast the level of mean CPU utilization for each computer 106 over time. In another embodiment, the resultant autoregressive modeling tool 216 may be an autoregressive moving average (ARMA) model. These constructs predict a moving average parameter estimate divided by a coefficient of the lagged autoregressive value of CPU utilization for each computer 106 and its estimated value. These constructs also predict a random error. Tables 9–12 list the regression estimates for the moving average parameters (MA) and the autoregressive parameters (AR) of the mean CPU utilization (MU) for the computers 106a–106d, respectively. The column "T Ratio" indicates values for a "T" test of validity for a particular statistic. For example, the T Ratio indicate whether "t" values are less than or equal to a given level of confidence.

TABLE 9

Conditional Least Squares Estimation of the Time Series for the Computer 106a

| Parameter | Estimate | Random Error | T Ratio | Lag |
|---|---|---|---|---|
| MU | 0.89907 | 0.17365 | 2.30 | 0 |
| MA1, 1 | 0.51935 | 0.05436 | 18.40 | 1 |
| AR1, 1 | 0.73434 | 0.04533 | 4.99 | 1 |

Constant Estimate = 0.2757353

TABLE 10

Conditional Least Squares Estimation of the Time Series for the Computer 106b

| Parameter | Estimate | Random Error | T Ratio | Lag |
|---|---|---|---|---|
| MU | 0.75565 | 0.57312 | 0.27 | 0 |
| MA1, 1 | 0.48501 | 0.19567 | 4.48 | 1 |
| AR1, 1 | 0.71503 | 0.21807 | 7.99 | 1 |

Constant Estimate = 0.18911627

TABLE 11

Conditional Least Squares Estimation of the Time Series for the Computer 106c

| Parameter | Estimate | Random Error | T Ratio | Lag |
|---|---|---|---|---|
| MU | 0.87759 | 0.09295 | 2.99 | 0 |
| MA1, 1 | 0.99100 | 0.08170 | 12.24 | 1 |
| AR1, 1 | 0.77904 | 0.15489 | 5.51 | 1 |

Constant Estimate = 0.25564741

TABLE 12

Conditional Least Squares Estimation of the Time Series for the Computer 106d

| Parameter | Estimate | Random Error | T Ratio | Lag |
|---|---|---|---|---|
| MU | 0.77650 | 0.04372 | 1.75 | 0 |
| MA1, 1 | 0.99240 | 0.06205 | 16.12 | 1 |
| AR1, 1 | 0.83932 | 0.11828 | 6.02 | 1 |

Constant Estimate = 0.07628922

The autoregressive modeling tool 216 "fits the data" or matches the theoretical autocorrelation functions of different autoregressive modeling constructs to the autocorrelation functions computed from the time series. The autoregressive modeling tool 216 thus forecasts CPU utilization with ninety-five percent accuracy, provides an upper ninety-five percent confidence level, and provides a lower ninety-five percent confidence level for all computers 106. This embodiment of the present is therefore advantageous over conventional systems and methods that rely on linear regression or multivariable regression techniques, which may carry a lower confidence level.

An ARIMA(1,1,1) construct in one embodiment forecasts the level of CPU utilization. This represents that the ARIMA construct has one (1) autoregressive term, one (1) nonseasonal difference, and one (1) lagged forecast error in its prediction equation, $\dot{Z}_t=\mu+Z(t-1)+\phi_1(Z(t-1)-Z(t-2))-\theta_{ie}(t-1)$, where $\theta_1$ is a moving average parameter and $\phi_1$ is an autoregressive parameter. The ARIMA (1,1,1) construct for forecasting the level of CPU utilization is equivalent to an ARMA (1,1) construct, which forecasts the change in CPU utilization. The ARMA construct has one (1) autoregressive term, one (1) nonseasonal difference, and zero (0) lagged forecast errors in its prediction equation, $(1-\phi_1B)\dot{Z}_t=(1-\theta_1B)\alpha_t$, where $\theta_1$ is a moving average parameter, $\phi_1$ is an autoregressive parameter, B is a backshift operator, and $\alpha_t$ is a zero mean white noise process. Accordingly, the autoregressive moving average for the computer 106a is given by (1−B) cpubusy$_t$=0.89909+(1+0.51935 B)/(1−0.73434 B) $\alpha_t$. The autoregressive moving average for the computer 106b is given by (1−B) cpubusy$_t$=0.75565+(1+0.48501 B)/(1−0.71503 B)$\alpha_t$. The autoregressive moving average for the computer 106c is given by (1−B) cpubusy$_t$=0.87759+(1+0.99100 B)/(1−0.77904 B) $\alpha_t$. The autoregressive moving average for the computer 106d is given by (1−B) cpubusy$_t$=0.77650+(1+0.99240 B)/(1−0.83932 B) $\alpha$.

II. Autoregressive Forecasting of Computing Resources

Figure 4:
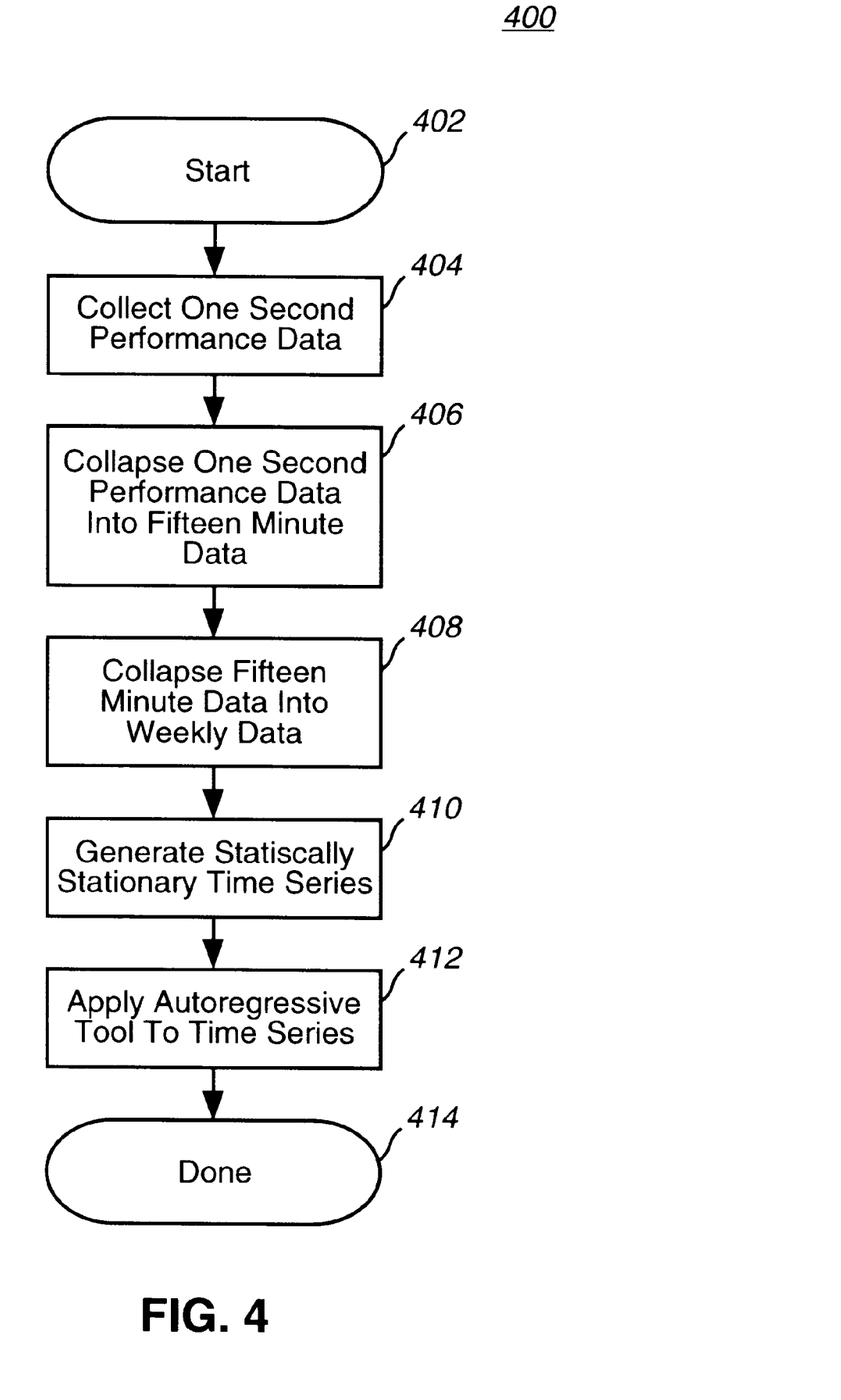
FIG. 4 shows a flowchart of a forecasting process suitable for use in an embodiment of the present invention.

FIG. 4 depicts a flow chart of a collecting, collapsing, and regresssing process 400 suitable for use in one embodiment of the present invention. Task 402 starts the process 400, where control immediately passes to task 404. Task 404 extracts performance data from at least one of the computers 106. In one embodiment, the resource manager 202 extracts the performance data from its associated computer every second.

Task 406 statistically collapses the performance data into a first time series. In one embodiment, the statistical collapser 204 generates a time series representing a performance metric as though its associated performance data had been collected at fifteen minute intervals. The database 206 then stores the fifteen minute time series. The data extractor 208 extracts the time series representing performance data collected at fifteen minute intervals from the database 206.

Task 408 statistically collapses the first time series into a second time series. In one embodiment, the statistical collapser 210 generates a second time series representing performance data as though it had been collected weekly. Task 408 then determines whether the weekly time series is statistically stationary. If the time series is statistically stationary, then task 408 writes the time series to the time point converter 214.

If, on the other hand, the time series is statistically nonstationary, then task 410 converts the statistically nonstationary time series to a statistically stationary time series by differencing each time point, as explained above. After task 410 generates the statistically stationary time series, task 410 writes the converted time series to the time point converter 214. The time point converter 214 converts the date/time stamp associated with each data point in the time series to an equivalent data point suitable for use in the autoregressive modeling tool 216, as explained above.

Task 412 applies the autoregressive modeling tool 216 to the time series to generate forecasts of the computing platform 100 resources. Task 412 also generates recursive forecasts whereby actual future performance data is fed back into the autoregressive modeling tool 216 to calibrate the system and method. Task 414 completes the process 400. This process provides a turnkey solution to CPU utilization forecasting that can be implemented easily by any system network manager.

Referring back to FIG. 1, the computing platform 100 may include a results processor 104. The results processor 104 generates graphical representations of performance data extracted from the computing platform 100. The results processor 104 generates information for use in written reports that document the results of the process 400. In the embodiment where the performance metric is resource utilization and the resource is a central processing unit of the computers 106, the results processor 104 produces reports and graphical representations of comparisons of actual CPU utilization with CPU utilization forecasts.

For example, Tables 5–8, above, are textual representations produced by the results processor 104. Recall that Tables 5–8 represent the CPU utilization performance metric for the computers 106a–106d, respectively. Tables 5–8 thus include a "forecast" column, a "lower 95% confidence level" column and an "upper 95% confidence level" column.

Figure 5:
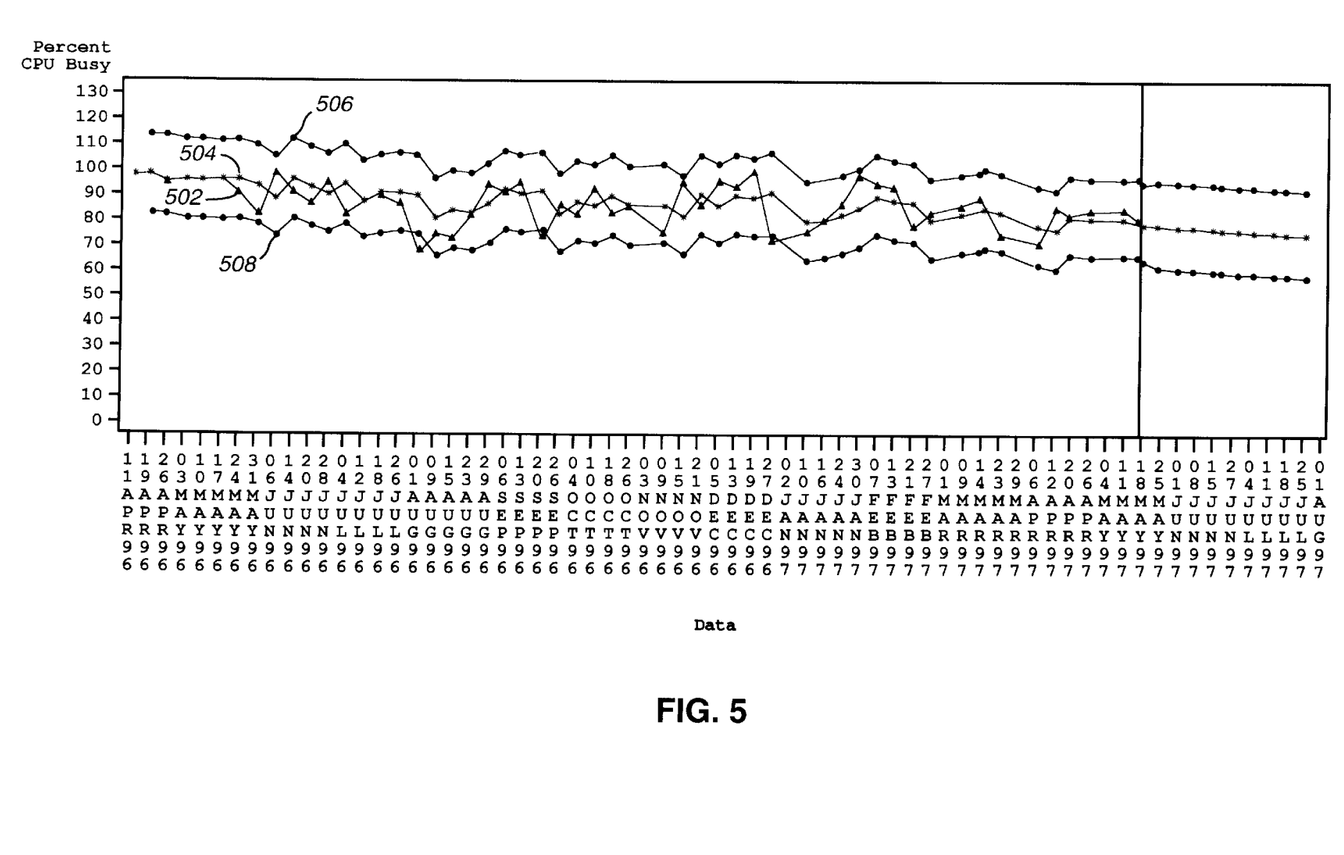
FIG. 5 graphically depicts the comparisons of actual CPU utilization with CPU utilization forecasts which may be produced by one embodiment of the present invention.

FIG. 5 depicts an exemplary graphical representation produced utilizing one embodiment of the results processor 104. The graphical representation 500 corresponds to the data contained in Table 1 above of CPU utilization for the computer 106a. Graph 502 represents actual CPU utilization. Graph 504 represents forecast CPU utilization. Note that the Tables 5–8 and the graphical representation 500 illustrate that the forecast performance metric somewhat accurately represents actual CPU utilization.

Graph 506 represents the upper ninety-five percent confidence interval. This confidence interval provides an estimated range of values which is likely to include an unknown parameter. For example, for each weekly time point taken, ninety-five percent of the time points will include an unknown parameter. Graph 508 represents the lower ninety-five percent confidence interval. Note that the forecast values fall within the ninety-five percent confidence intervals. The graphical and textual representations demonstrate the greater accuracy and reliability which the present invention provides over conventional forecasting systems and methods.

Referring back to FIG. 1, in one embodiment, the results processor 104 is external to the computing network 102, as represented by the results processor 104a. In an alternate embodiment, the results processor 104 is internal to the computing network 102, as represented by the results processor 104b.

The system and method may be implemented in computer software run on a computer. Alternately, the system and method may be implemented using hardware or a combination of hardware and software, and may be implemented in a computer system or other processing system. In an embodiment where the invention is implemented using software, the software may be stored on a computer program product (such as an optical disk, a magnetic disk, a floppy disk, etc.) or program storage device (such as an optical disk drive, magnetic disk drive, floppy disk drive, etc.). After reading this description, it will become apparent to a person skilled in the relevant art how to implement the system and method using computer systems and architectures.

III. Conclusion

Although specific embodiments of, and examples for, the present invention are described herein for illustrative purposes, various equivalent modifications are possible within the scope of the invention, as will be recognized by those skilled in the relevant art. The teachings provided herein of the present invention can be applied to other computing platforms, not necessarily the exemplary computing platform described above. For example, the teachings provided herein can be applied to UNIX machines as well.

In a telecommunications environment, aspects of the present invention generally can be applied to Internet metering data, marketing data on the success or failure of product offerings, telephone usage patterns, cash flow analyses, financial data, customer survey data on product reliability, customer survey data on product preference, etc. Moreover, aspects of the present invention can be applied not only to a single performance metric of a computing platform, such as CPU utilization, but also to a plurality of performance metrics, such as disk drive usage percentage, Internet traffic, users logged on to the Internet, network communications packet traffic, and users logged onto a particular server, for example. The system and method may also be utilized to forecast these and other performance metrics for configuration management or performance management purposes.

These and other changes can be made to the invention in light of the above-detailed description. In general, in the following claims, the terms used should not be construed to limit the invention to the specific embodiments disclosed in the specification and claims, but should be construed to include all computer platforms that operate under the claims to provide a system and method for computing resource forecasting utilization.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. In a computing platform having a plurality of resources, each resource includes at least one aspect, a method for forecasting at least one aspect of the plurality of resources to produce computing platform resource performance forecasts, the method comprising the steps of:

collecting at intervals performance data associated with a performance metric from a computing platform resource;

statistically collapsing the collected performance data associated with a performance metric at least once to produce a time series and storing the time series;

determining whether the time series is statistically stationary using a plurality of chi-square tests;

converting the time series to a statistically stationary time series when the time series is determined not to be statistically stationary;

bypassing the converting when the time series is determined to be statistically stationary;

adding a date/time stamp to the time series, including converting the time series date/time stamp to a number of seconds equivalent to the value represented by the date/time stamp;

applying an autoregressive modeling tool to the time series to produce computing platform resource performance forecasts; and outputting the resource performance forecasts in a format such that computing platform resources can be modified based on the data.

2. A system to forecast performance of at least one computing platform resource, comprising:

a resource manager for collecting performance data associated with a performance metric from a computing platform resource;

a first statistical collapser receiving input from the resource manager, the first statistical collapser collapsing the data received from the resource manager into a first time series;

a second statistical collapser, the second statistical collapser collapsing the data received from the first statistical collapser into a second time series;

a time series analyzer coupled to the second statistical collapser and configured to:
 determine whether the second time series is statistically stationary using a plurality of chi-square tests,
 convert the second time series to a statistically stationary time series when the second time series is determined not to be statistically stationary, and
 bypass the converting when the second time series is determined to be statistically stationary;

a time point converter coupled to the time series analyzer, the time point converter being operable to add a date/time stamp to the second time series and wherein the time point converter converts the time series date/time stamp to a number of seconds equivalent to the value represented by the date/time stamp;

an autoregressive modeling tool coupled to the time series analyzer, the autoregressive modeling tool producing computing platform resource performance forecasts; and a result processor coupled to the autoregressive modeling tool.

3. The system according to claim 2, further comprising a database coupled to the first statistical collapser.

4. The system according to claim 3, further comprising a data extractor coupled to the database.

5. The system according to claim 2, wherein the performance metric represents one of redundancy or efficiency of at least one computing platform service.

6. The system according to claim 2, wherein the performance metric represents utilization and the computing platform resource comprises a central processing unit.

7. The system according to claim 2, wherein the first statistical collapser comprises a fifteen minute time series generator.

8. The system according to claim 2, wherein the second statistical collapser comprises a weekly time series generator.

9. The system according to claim 2, wherein the time series analyzer comprises a time series differencer.

10. The system according to claim 2, wherein the autoregressive modeling tool comprises an autoregressive moving average modeling tool.

11. The system according to claim 2, wherein the autoregressive modeling tool comprises an autoregressive integrated moving average modeling tool.

12. The computing platform according to claim 1, further comprising feeding actual future performance data into the autoregressive modeling tool to generate recursive forecasts.

13. The method of claim 1, wherein the statistically collapsing the collected performance data associated with a performance metric at least once comprises:
    statistically collapsing the collected performance data to produce a first time series,
    storing the first time series in a database,
    extracting the first time series from the database, and
    statistically collapsing the first time series to produce a second time series; and wherein the determining whether the time series is statistically stationary comprises:
        determining whether the second time series is statistically stationary.

* * * * *